(12) United States Patent  (10) Patent No.: US 9,197,304 B2
Roman et al.  (45) Date of Patent: *Nov. 24, 2015

(54) METHOD AND APPARATUS FOR CONVEYING ANTENNA CONFIGURATION INFORMATION VIA MASKING

(71) Applicant: Nokia Technologies Oy, Espoo (FI)

(72) Inventors: Timo Eric Roman, Espoo (FI); Bernhard Raaf, Neuried (DE); Mieszko Chmiel, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/474,700

(22) Filed: Sep. 2, 2014

(65) Prior Publication Data

US 2014/0369443 A1  Dec. 18, 2014

Related U.S. Application Data

(63) Continuation of application No. 12/866,236, filed as application No. PCT/IB2009/050044 on Jan. 7, 2009, now Pat. No. 8,831,542.

(60) Provisional application No. 61/025,908, filed on Feb. 4, 2008.

(51) Int. Cl.
*H03C 7/02* (2006.01)
*H04B 1/02* (2006.01)
(Continued)

(52) U.S. Cl.
CPC ............... *H04B 7/06* (2013.01); *H04B 7/0689* (2013.01); *H04L 1/0041* (2013.01)

(58) Field of Classification Search
USPC .................. 455/63.1, 101, 562.1, 509, 114.2; 375/299, 365–370, 267, 340
See application file for complete search history.

(56) References Cited

U.S. PATENT DOCUMENTS 5,218,562 A  6/1993  Basehore et al.
5,353,352 A  10/1994  Dent et al.
(Continued)

FOREIGN PATENT DOCUMENTS

AU  2009211153 B2  10/2012
CN  1765064 A  4/2006
(Continued)

OTHER PUBLICATIONS

Office Action for Chinese Application No. 200880123829.3 dated May 3, 2013.
(Continued)

*Primary Examiner* — Edward Urban
*Assistant Examiner* — Rui Hu
(74) *Attorney, Agent, or Firm* — Alston & Bird LLP

(57) ABSTRACT

A method, apparatus and computer program product are provided for conveying information regarding the antenna configuration and/or the transmission diversity scheme to a recipient, such as a mobile device. In particular, information regarding the antenna configuration and/or the transmission diversity scheme can be conveyed by masking, such as cyclic redundancy check masking, to provide information regarding the antenna configuration and/or the transmission diversity scheme. In this regard, a set of masks can be determined based upon hamming distances between the masks and bit diversities between the masks and where each of the masks within the set is associated with an antenna configuration and a transmission diversity scheme.

20 Claims, 4 Drawing Sheets

(51) Int. Cl.
*H04B 7/02* (2006.01)
*H04B 7/06* (2006.01)
*H04L 1/00* (2006.01)

(56) References Cited

U.S. PATENT DOCUMENTS

| | | | |
|---|---|---|---|
| 5,862,160 A | 1/1999 | Irvin et al. | |
| 7,324,605 B2 | 1/2008 | Maltsev et al. | |
| 7,500,174 B2 | 3/2009 | Sangster et al. | |
| 7,508,751 B2 | 3/2009 | Byun et al. | |
| 7,539,501 B2 | 5/2009 | Moorti et al. | |
| 7,864,661 B2 | 1/2011 | Hosur et al. | |
| 8,028,217 B2 | 9/2011 | Pietraski et al. | |
| 8,135,359 B2 * | 3/2012 | Raaf et al. | 455/101 |
| 8,194,786 B2 | 6/2012 | Loh et al. | |
| 8,418,025 B2 * | 4/2013 | Cho et al. | 714/758 |
| 8,619,742 B2 | 12/2013 | Cheng et al. | |
| 8,824,420 B2 | 9/2014 | Mehta et al. | |
| 8,831,542 B2 * | 9/2014 | Roman et al. | 455/101 |
| 2004/0114529 A1 | 6/2004 | Dong-Hi et al. | |
| 2004/0147289 A1 * | 7/2004 | Paljug et al. | 455/562.1 |
| 2007/0135161 A1 * | 6/2007 | Molnar et al. | 455/553.1 |
| 2007/0254679 A1 | 11/2007 | Montojo et al. | |
| 2008/0019350 A1 * | 1/2008 | Onggosanusi et al. | 370/350 |
| 2008/0273610 A1 * | 11/2008 | Malladi et al. | 375/260 |
| 2009/0060088 A1 * | 3/2009 | Callard et al. | 375/299 |
| 2009/0149207 A1 * | 6/2009 | Zhang et al. | 455/500 |
| 2009/0156194 A1 * | 6/2009 | Meylan | 455/422.1 |
| 2009/0176463 A1 | 7/2009 | Roman et al. | |
| 2010/0220657 A1 * | 9/2010 | Goransson et al. | 370/328 |

FOREIGN PATENT DOCUMENTS

| | | |
|---|---|---|
| EP | 1 686 701 A1 | 8/2006 |
| EP | 1 679 814 A2 | 12/2006 |
| JP | 2006197597 A | 7/2006 |
| WO | WO 2007/024214 A1 | 3/2007 |
| WO | WO 2007/040554 A2 | 4/2007 |
| WO | WO 2009/090482 A2 | 7/2009 |

OTHER PUBLICATIONS

Office Action for Chinese Application No. 200980104114.8 dated May 6, 2013.
U.S. Appl. No. 60/954,357, filed Aug. 7, 2007, In re: Callard et al., entitled Blind Detection of the Number of Transmit Antennas Using the Primary Broadcast Channel (P-CBH), 11 pages.
Substantive Examination Adverse Report (Section 30(1)) for Malaysian Application No. PI 2010003665; dated Dec. 31, 2013.
Office Action for Chinese Application No. 200880123829.3 dated Jan. 14, 2013.
*The Detection of the Antenna Configuration*, Nortel, GPP TSG-RAN WG1 Meeting #50, R1-073309, Aug. 2007, pp. 1-9.
Office Action for Australian Application No. 2008348043 dated May 3, 2012.
Office Action for Australian Application No. 2009211153 dated Jun. 21, 2012.
Office Action for Japanese Application No. 2010-540183 dated Aug. 2, 2012.
Office Action for Canadian Application No. 2,709,607 dated Jul. 4, 2012.
Office Action for Chinese Application No. 200980104114.8 dated Aug. 31, 2012.
3GPP TSG RAN WG1 #51bis Meeting; R1-080324; Nokia Siemens Networks, Nokia, China Mobile, Huawei; "Issues with PBCH-based Blind Antenna Configuration Detection"; Sevilla, Spain; Jan. 14-18, 2008.
Office Action received in corresponding Russian Application No. 2010132264 dated Sep. 1, 2011, 10 pages.
Office Action received in corresponding Mexican Application No. MX/a/2010/006594, dated Oct. 21, 2011 6 pages.
Office Action recieved in corresponding Japan Application No. 2010-541869 dated Dec. 20, 2011, 8 pages.
Nokia Siemens Networks et al: "Issues with PBCH-based Blind Antenna Configuration Detection" 3GPP Draft; R1-080324, $3^{rd}$ Generation Partnership Project (3GPP), Mobile Competence Centre; 650 Route Des Lucioles; F-06921 Sophia-Antipolis Cedex; France, vol. RAN WG1, no. Sevilla, Spain; Jan. 8, 2008, XP050108845.
Nokia Siemens Network, et al., "Multi-cell PBCH coverage and capacity", 3GPP TSG-RAN WG1 Meeting #51bis, R1-080327, Agenda item: 6.1.8, Jan. 14-18, 2008, 8 pages.
T Roman, "Invariant PBCH structure: issues with blind detection", Presentation during DL-SCT meeting on Nov. 30, 2007.
International Preliminary Report on Patentability received for corresponding Patent Cooperation Treaty Application No. PCT/IB2009/050044, dated Aug. 10, 2010, 6 pages.
Office Action received for corresponding Korean Patent Application No. 2010-7014812, dated Jun. 6, 2011, 5 pages of office action and 2 pages of English translation.
Office Action received for corresponding Korean Patent Application No. 2010-7017354, dated Jun. 14, 2011, 7 pages of office action and 3 pages of English translation.
Office Action received for corresponding Russian Patent Application No. 2010136175/08, dated Mar. 12, 2012, 11 pages of office action and 5 pages of English translation.
Non-Final Office Action received for corresponding U.S. Appl. No. 11/969,794, dated Oct. 12, 2010, 14 pages.
Non-Final Office Action received for corresponding U.S. Appl. No. 11/969,794, dated Apr. 18, 2011, 13 pages.
Partial Search Report for corresponding Patent Cooperation Treaty Application No. PCT/IB2008/003554, dated Aug. 25, 2009, 9 pages.
Office Action received for corresponding Indonesian Patent Application No. W-00201003074, 2 pages of office action and 1 page of English translation.
Office Action received for corresponding Mexican Patent Application No. MX/2010/006592, Sep. 12, 2011, 2 pages of office action.
International Search Report and Written Opinion of the International Searching Authority for corresponding International Patent Cooperation Treaty Application PCT/IB2009/050044, dated Aug. 24, 2009, 14 pages.
Nokia Siemens Networks et al., "CRC Mask Selection for PBCH", 3GPP Draft R1-080944, $3^{rd}$ Generation Partnership Project (3GPP), Mobile Competence Centre, vol. 1, RAN WG1, Feb. 5, 2008.
Nokia Siemens Networks et al., "Way Forward on PBCH for FDD and TDD", 3GPP Draft; R1-080586; $3^{rd}$ Generation Partnership Project (3GPP), Mobile Competence Centre, RAN WG1, Jan. 17, 2008.
Nokia Siemens Networks et al., "Issues with PBCH-based Blind Antenna Configuration Detection", 3GPP Draft; R1-080324; $3^{rd}$ Generation Partnership Project (3GPP), Mobile Competence Centre, RAN WG1, Jan. 8, 2008.
3GPP TS 36.211, Technical Specification Group Radio Access Network, "Evolved Universal Terrestrial Radio Access (E-UTRA); Physical Channels and Modulation", v.8.0.0., Sep. 2007, 50 pages.
Nortel, 3GPP TSG-RAN WG1 Meeting #50, "The detection of the antenna configuration", R1-073309, Athens, Greece, Aug. 20-24, 2007, 9 pages.
Nokia Siemens Networks, Nokia, Motorola, Panasonic, 3GPP TSG RAN WG1 #51 Meeting "Invariant PBCH Structure", R1-074861, Jeju, Korea, Nov. 5-9, 2007, 5 pages.
Broadcom, Lucent-Alcatel, Huawei, Nokia, "SFBC Definition Based on the 3GPP WCDMA/HSDPA Standard", R1-072405, Kobe, Japan, May 7-11, 2007, 2 pages.
3GPP TS 36.212, Technical Specification Group Radio Access Network, "Evolved Universal Radio Access (E-UTRA); Multiplexing and channel coding", v.8.0.0, Sep. 2007.
International Preliminary Report on Patentability from related PCT Application No. PCT/IB2008/003554, dated Apr. 9, 2010.
International Search Report and Written Opinion of the International Searching Authority from related PCT Application No. PCT/IB2008/003554, dated Nov. 17, 2009.
Office Action received in corresponding Mexican Application No. MX/a/2010-006592 dated Oct. 5, 2011, 6 pages.

(56) References Cited

OTHER PUBLICATIONS

Nokia Siemens Networks et al: "Issues with PBCH-based Blind Antenna Configuration Detection" 3GPP Draft; R1-080324, 3rd Generation Partnership Project (3GPP), Mobile Competence Centre; 650, Route Des Lucioles; F-06921 Sophia-Antipolis Cedex; France, vol. RAN WG1, No. Sevilla, Spain; Jan. 8, 2008, XP050108845.

Sadek, M. et al.; "*Active Antenna Selection in Multiuser MIMO Communications*"; IEEE Transactions on Signal Processing; vol. 55, Issue 4; Apr. 2007; pp. 1498-1510.

Hodgkinson, T G; "Wireless Communication—the fundamentals"; *BT Technology Journal*; vol. 25, No. 2; Apr. 2007; pp 11-26.

Brink, Stephan Ten, et al.; "Coding Over Space and Time for Wireless Systems"; *IEEE Wireless Communications*; Aug. 2006; pp. 18-30.

\* cited by examiner

METHOD AND APPARATUS FOR CONVEYING ANTENNA CONFIGURATION INFORMATION VIA MASKING

CROSS REFERENCE TO RELATED APPLICATION

This application is a continuation of and claims priority to U.S. application Ser. No. 12/866,236, filed on Aug. 4, 2010, which is a national phase entry of PCT International Application No. PCT/IB2009/050044, filed on Jan. 7, 2009, which claims the benefit of U.S. Provisional Application No. 61/025,908, filed on Feb. 4, 2008, the entire contents of which are hereby incorporated by reference.

TECHNOLOGICAL FIELD

Embodiments of the present invention relate generally to communications between a network entity, such as a base station, and a recipient, such as a mobile terminal, and, more particularly, relate to a method and apparatus for conveying antenna configuration information.

BACKGROUND

In conventional wireless communications systems, mobile devices or other user equipment transmit information to a network, and receive information from a network, such as via a base station. In some networks, the base stations, or other network entities which transmit information to the user equipment, may include different antenna configurations, such as different numbers of antennas, e.g., one antenna, two antennas or four antennas, and/or may transmit the information in accordance with different transmission diversity schemes. In this regard, a base station with a single antenna may transmit information without any transmission diversity scheme, while base stations with two or four antennas may transmit information in accordance with a transmission diversity scheme or a specific transmission diversity scheme out of a set of different available transmission diversity schemes. In order to effectively receive information from a base station, for example, the user equipment must know or recognize the antenna configuration and/or the transmission diversity scheme utilized by the base station. A mobile device may be able to effectively demodulate a received signal only after correctly determining the antenna configuration, i.e., the number of transmit antennas and/or the transmission diversity scheme of a base station. Since the antenna configuration information is needed in order to effectively demodulate the received signal, the antenna configuration information must be determined by the user equipment with very high reliability.

For example, in an Evolved Universal Mobile Telecommunication System (UMTS) Terrestrial Radio Access Network (E-UTRAN), the user equipment can gather antenna configuration information regarding the base station, termed an eNodeB in EUTRAN, using data contained within orthogonal frequency division multiplexing (OFDM) symbols of a message. By way of example, the technical specifications of the Third Generation Partnership Project (3GPP) and, in particular, 3GPP TS 36.211, REL 8 and 3GPP TS 36.212, REL 8 allows for an approach for providing antenna configuration information. In this regard, the user equipment can extract antenna configuration information from provided reference signals or by attempts to decode data within a physical broadcast channel (PBCH).

In E-UTRAN, the eNodeB does not explicitly inform the user equipment of the number of antennas and, in turn, the transmission diversity scheme. Instead, the user equipment can generally analyze the provided reference signals in an effort to determine the number of antennas and/or the transmission diversity scheme employed by the eNodeB. In general, reference signals are placed throughout a sub-frame, within the PBCH and otherwise, according to the number of transmit antennas at the base station. The reference signals are mainly intended to be used for channel estimation purposes. Regardless of a reference signal's location within the sub-frame, detecting the presence of a reference signal can allow, in some instances, user equipment to determine the number of transmit antennas at the base station. However, such a procedure may not always be reliable at the low signal-to-noise ratio conditions where the PBCH is designed to operate.

While, in some instances, antenna configuration information can be derived from reference signals, the user equipment is, at least initially, not aware of the antenna configuration and/or the transmission diversity scheme prior to receiving and demodulating the PBCH. Further, since the antenna configuration information is needed to properly demodulate data and control channels, data loss and latency can result if the user equipment incorrectly identifies the antenna configuration and/or the transmission diversity scheme or if the user equipment is slow in identifying the antenna configuration and/or the transmission diversity scheme. As a result, some user equipment is designed to make assumptions regarding the antenna configuration and/or transmission diversity scheme. These assumptions of antenna configuration and/or transmission diversity scheme may be made prior to, or during demodulation of the PBCH and may not always be correct. In this regard, user equipment may reach an assumption regarding the antenna configuration and/or transmission diversity scheme based on a subset of the information in the PBCH. For example, in some instances, an early PBCH decoding scheme may be utilized which uses information gathered from the first of four bursts of information comprising the PBCH.

However, even when an incorrect assumption is made regarding the antenna configuration and/or the transmission diversity scheme, the error is not always readily apparent upon demodulation and decoding. In some instances, the PBCH can be properly demodulated and decoded even when an incorrect assumption has been made. This situation is referred to as a false detection. In these situations, the user equipment has no means for detecting the erroneous assumption. As such, the user equipment can continue to use an incorrect assumption in further communications resulting in poor performance.

In addition to the issues that come as a result of the user equipment blindly selecting an antenna configuration and/or a transmission diversity scheme, noise in the signal associated with the PBCH can also generate errors. In low signal-to-noise ratio conditions the combination of an incorrect assumption and data corrupted by noise can result in a demodulated and decoded PBCH that appears to be correct. Further, in the same conditions, an accurate assumption with respect to antenna configuration and/or transmission diversity can appear to be incorrect due to the presence of noise. However, some of these cases may be identified by the user equipment because the PBCH is protected by cyclic redundancy check (CRC) bits. It is common for the CRC associated with the PBCH to contain 16 bits. In this regard, some of the errors resulting from a low signal-to-noise ratio can be identified when the CRC check is performed. However, noise can also affect the CRC bits which can further result in erroneous conclusions as to the correct antenna configuration and/or transmission diversity scheme.

Thus, in order to avoid or reduce the loss of data and communication latency, it would be desirable to provide an improved technique for more reliably determining the antenna configuration and/or transmission diversity scheme of a network entity, such as a base station. In particular, it would be desirable to provide a mechanism for determining the antenna configuration and/or the diversity scheme of base station, such as an EUTRAN eNodeB, that results in a substantially high reliability for determining if the correct assumption regarding antenna configuration and/or transmission diversity has been made.

BRIEF SUMMARY

A method, apparatus, and computer program product are therefore provided in accordance with embodiments of the present invention to provide additional information relating to an antenna configuration and/or a transmission diversity scheme. As such, embodiments of the method and apparatus permit a recipient to reliably distinguish between a plurality of antenna configurations and/or transmission diversity schemes, thereby permitting the transmitted data to be more reliably demodulated and interpreted. Moreover, embodiments of the method and apparatus are configured to provide this additional information without transmitting any additional bits or otherwise adding to the overhead associated with the transmission of the data.

According to various embodiments of the invention, a method, apparatus and computer program product are provided for determining a set of bit masks based upon hamming distances between the masks and bit diversities between the masks and where each of the masks within the set is associated with an antenna configuration and a transmission diversity scheme. Further, in some embodiments, a set of masks can be determined such that the hamming distances between the masks are maximized and the bit diversities between the masks are maximized. Further, in some embodiments, considerations such as the probability of false detections and the likelihood of block corruption of bits can also be factored into the determination of the set of masks. One mask within the set can be selected based upon an antenna configuration and/or a transmission diversity scheme. The mask can then be used for masking a plurality of bits to be transmitted to thereby impart information regarding the antenna configuration and/or the transmission diversity scheme. In one embodiment, for example, the plurality of bits which are masked may be a plurality of cyclic redundancy check (CRC) bits. In one embodiment, the bit mask is sufficient to permit at least three different antenna configurations or transmission diversity schemes to be uniquely distinguished.

In another aspect, a method, apparatus and computer program product are provided for analyzing a plurality of bits that were received to determine which one of a set of predefined bit masks has been applied to the bits, and for then determining an antenna configuration and/or a transmission diversity scheme based upon the respective bit mask that is determined to have been applied to the bits. In order to determine which one of a set of predefined bit masks has been applied to the bits a mask can be selected from a set of masks that is determined based upon hamming distances between the masks and bit diversities between the masks and where each of the masks within the set is associated with an antenna configuration and a transmission diversity scheme. Further, in some embodiments, the set of masks can be determined such that the hamming distances between the mask are maximized and the bit diversities between the masks are maximized. Further, in some embodiments, considerations such as the probability of false detections and the likelihood of block corruption of bits can also be factored into the determination of the set of masks. The selected mask can be applied to the received plurality of bits and then the result can be analyzed to determine if a correct mask has been selected. If an incorrect mask has been selected, a new mask selection can be made, the mask can be applied and the result analyzed in the same manner. The plurality of bits which are analyzed may be bits of a physical broadcast channel. In one embodiment, for example, the plurality of bits which are analyzed may be a plurality of CRC bits. In one embodiment, the bit mask is sufficient to permit at least three different antenna configurations or transmission diversity schemes to be uniquely distinguished.

Accordingly, in one exemplary embodiment, a method for conveying antenna configuration information via masking is described. The method may include selecting a bit mask associated with an antenna configuration and a transmission diversity scheme. In this regard, the bit mask may be selected from a set of bit masks. The set of bit masks may include a first bit mask associated with a single antenna configuration, a second bit mask associated with a two antenna configuration, and a third bit mask associated with a four antenna configuration. The method may also include applying the bit mask associated with the antenna configuration and the transmission diversity scheme to a set of predetermined bits within a plurality of bits.

In another exemplary embodiment, an apparatus for conveying antenna configuration information via masking is described. The apparatus may include a processor. The processor may be configured to select a bit mask associated with an antenna configuration and a transmission diversity scheme. In this regard, the bit mask may be selected from a set of bit masks. The set of bit masks may include a first bit mask associated with a single antenna configuration, a second bit mask associated with a two antenna configuration, and a third bit mask associated with a four antenna configuration. The processor may also be configured to apply the bit mask associated with the antenna configuration and the transmission diversity scheme to a set of predetermined bits within a plurality of bits.

In another exemplary embodiment, a computer program product for conveying antenna configuration information via masking is described. The computer program product may include at least one computer-readable storage medium having computer-readable program code instructions stored therein. The computer-readable program code instructions may be configured to select a bit mask associated with an antenna configuration and a transmission diversity scheme. In this regard, the bit mask may be selected from a set of bit masks. The set of bit masks may include a first bit mask associated with a single antenna configuration, a second bit mask associated with a two antenna configuration, and a third bit mask associated with a four antenna configuration. The computer-readable program code instructions may also be configured to apply the bit mask associated with the antenna configuration and the transmission diversity scheme to a set of predetermined bits within a plurality of bits.

In yet another exemplary embodiment, an apparatus for apparatus for application-based communications is described. The apparatus may include means for selecting a bit mask associated with an antenna configuration and a transmission diversity scheme. In this regard, the bit mask may be selected from a set of bit masks. The set of bit masks may include a first bit mask associated with a single antenna configuration, a second bit mask associated with a two antenna configuration, and a third bit mask associated with a four antenna configuration. The apparatus may also include means for applying the bit mask associated with the antenna configuration and the transmission diversity scheme to a set of predetermined bits within a plurality of bits.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
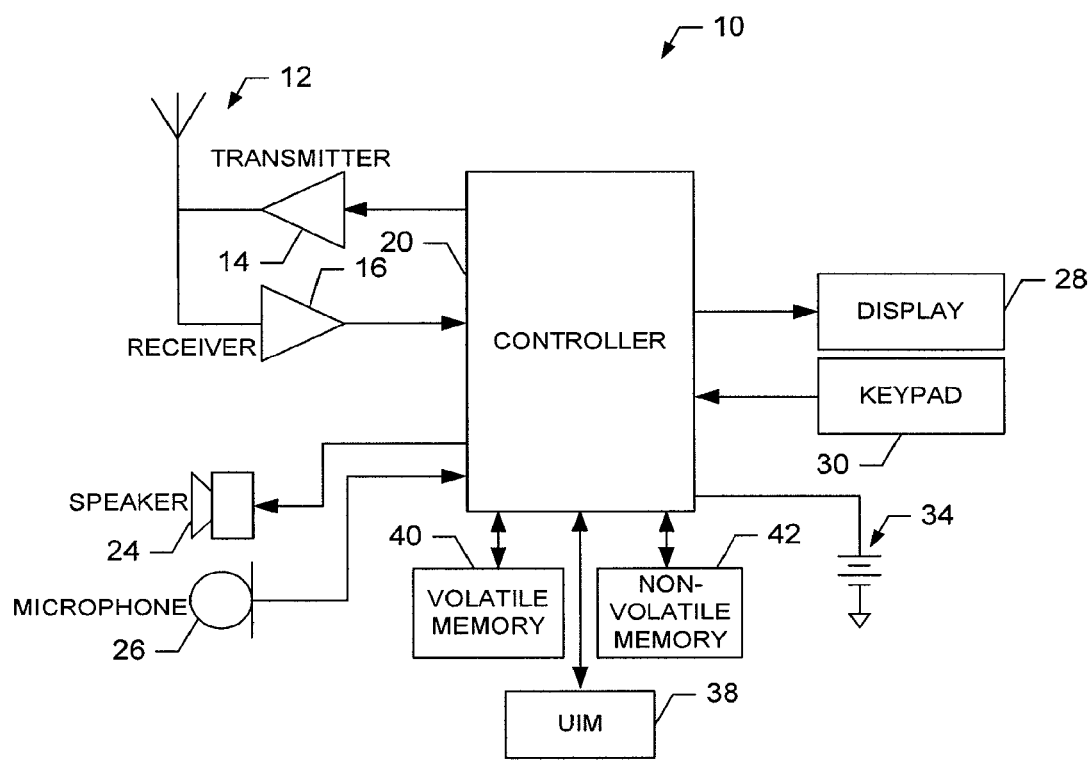
FIG. 1 is a schematic block diagram of a mobile terminal according to an embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal (also known as user equipment) that could benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, GPS devices and other types of voice and text communications systems, can readily employ embodiments of the present invention. Furthermore, user equipment that is not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 may further include an apparatus, such as a controller 20 or other processing element that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS) including UTMS Long Term Evolution (UTMS LTE), CDMA2000, wideband CDMA (WCDMA) and time division-synchronous CDMA (TD-SCDMA), with fourth-generation (4G) wireless communication protocols or the like.

It is understood that the apparatus such as the controller 20 includes means, such as circuitry, desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 may be allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a microphone 26, a display 28, and a user input interface, all of which may be coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and/or soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further may include a battery 34, such as a vibrating battery pack, for powering various circuits that may be required to operate the mobile terminal 10, as well as optionally providing mechanical vibration as a detectable output.

The mobile terminal 10 may further include a user identity module (UIM) 38. The UIM 38 may be a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 may store information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
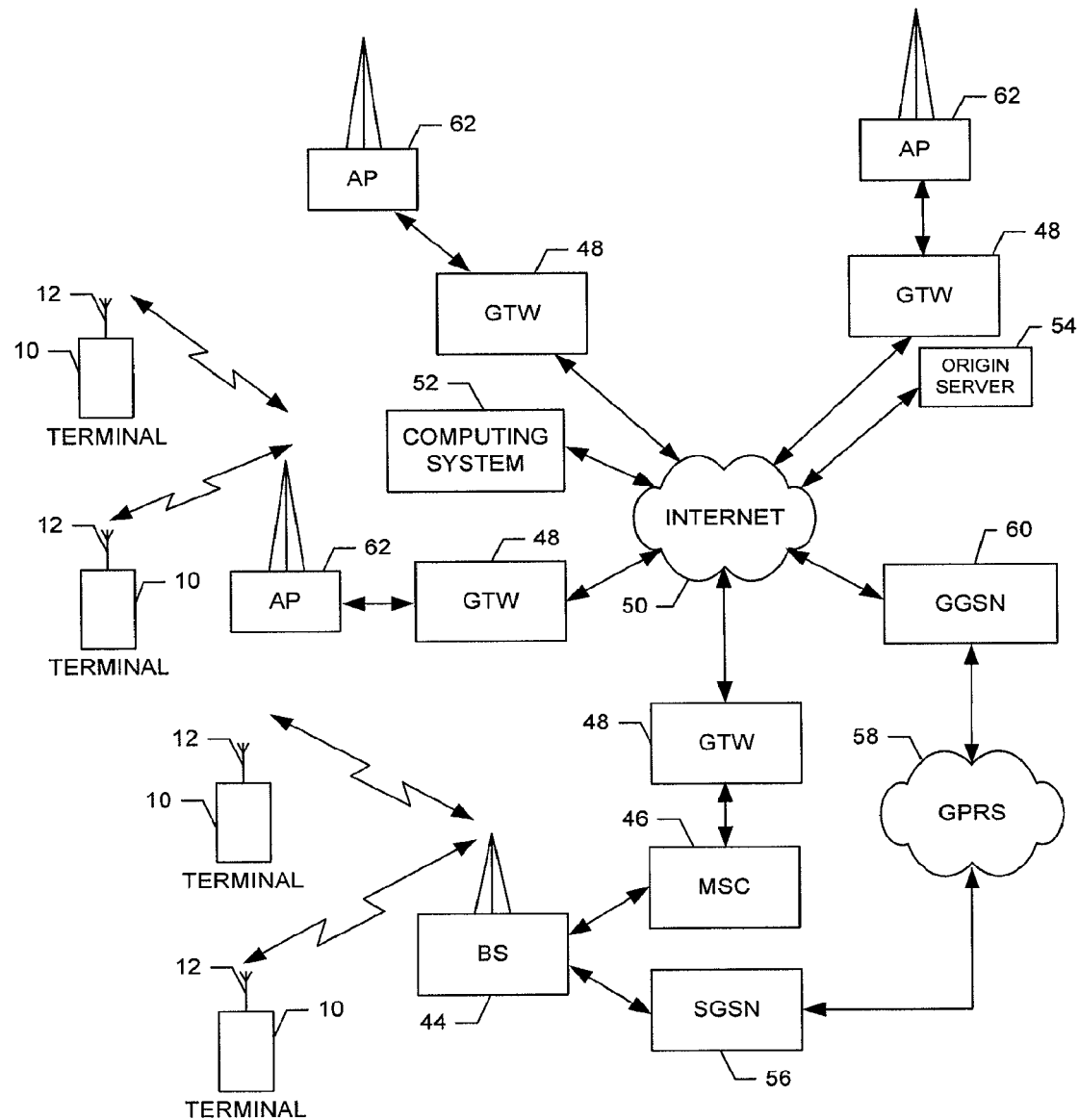
FIG. 2 is a schematic block diagram of a communications system according to an embodiment of the present invention.

Referring now to FIG. 2, an illustration of one type of system that would benefit from embodiments of the present invention is provided. The system includes a plurality of network devices, such as mobile terminals 10 or other types of user equipment. As shown, one or more mobile terminals 10 may each include an antenna 12 for transmitting signals to and for receiving signals from a base site or base station (BS) 44, such as an eNodeB in E-UTRAN. The base station 44 may be a part of one or more cellular or mobile networks each of which includes elements required to operate the network, such as a mobile switching center (MSC) 46. As well known to those skilled in the art, the mobile network may also be referred to as a Base Station/MS C/Interworking function (BMI). In operation, the MSC 46 may be capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 1, the MSC 46 is merely an exemplary network device and embodiments of the present invention are not limited to use in a network employing an MSC.

In one embodiment, the MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, the processing elements can include one or more processing elements associated with a computing system 52, origin server 54, and/or the like, as described below.

The BS 44 can also be coupled to a signaling GPRS (General Packet Radio Service) support node (SGSN) 56. As known to those skilled in the art, the SGSN 56 may be capable of performing functions similar to the MSC 46 for packet switched services. The SGSN 56, like the MSC 46, can be coupled to a data network, such as the Internet 50. The SGSN 56 can be directly coupled to the data network. In some embodiments, however, the SGSN 56 may be coupled to a packet-switched core network, such as a GPRS core network 58. The packet-switched core network may then be coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the HyperText Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one of a variety of communication protocols, such as one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as E-UTRAN or a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), world interoperability for microwave access (WiMAX) techniques such as IEEE 802.16, and/or ultra wideband (UWB) techniques such as IEEE 802.15 and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

As will be appreciated, by directly or indirectly connecting the mobile terminals 10 and the computing system 52, the origin server 54, and/or any of a number of other devices, to the Internet 50, the mobile terminals 10 can communicate with one another, the computing system, 52, the origin server 54, etc., to thereby carry out various functions of the mobile terminals 10, such as to transmit data, content or the like to, and/or receive content, data or the like from, the computing system 52, and/or the origin server 54, etc.

Further, with respect to communications between BS 44 and mobile terminal 10, BS 44 can utilize various antenna configurations and/or transmission diversity schemes. Antenna configurations can include BS 44 having one or more antennas that utilize various transmission diversity schemes. For example, in some embodiments, BS 44 can comprise a single transmit antenna. In other exemplary embodiments, BS 44 can comprise two transmit antennas that can use space-frequency block codes (SFBC) as a transmission diversity scheme. In still other exemplary embodiments, BS 44 can comprise four transmit antennas that can use a SFBC frequency switched transmit diversity (FSTD) transmission diversity scheme.

In this regard, upon the receipt of information from BS 44, mobile terminal 10 can make a blind assumption as to the antenna configuration and diversity scheme used by BS 44. Mobile terminal 10 makes this blind assumption as to the antenna configuration and the diversity used by BS 44 because, at this point in the interactions between BS 44 and mobile terminal 10, mobile terminal 10 can be unaware of the characteristics of BS 44. As such, mobile terminal 10 uses the assumption with respect to antenna configuration and transmission diversity scheme to demodulate and decode information transmitted by BS 44. In some instances, the information transmitted by BS 44 can include a PBCH within a sub-frame of data which is transmitted to the mobile terminal 10 in a burst fashion. The information transmitted by the BS 44 can also comprise CRC bits associated with the PBCH. Mobile terminal 10 can demodulate and decode the PBCH and the associated CRC bits using the assumed antenna configuration and transmission diversity scheme.

As discussed above, situations can occur where an incorrect assumption was made by the mobile terminal, but the data is demodulated and decoded properly by the mobile terminal. As such a false detection occurs. In order to substantially confirm that a correct assumption has been made by the mobile terminal 10 regarding the antenna configuration and the transmission diversity scheme of BS 44, according to various embodiments, a technique involving the masking of the CRC bits associated with the PBCH can be utilized. In some embodiments, the CRC bits can be masked by performing a logical exclusive-or between the CRC bits and a predetermined mask that is associated with a particular antenna configuration and transmission diversity scheme. A mask associated with the antenna configuration and transmission diversity scheme of BS 44 can be applied to the CRC bits at BS 44 prior to transmission of the PBCH and the associated CRC bits. Upon receipt of the PBCH and CRC bits, the mobile terminal can make an assumption with respect to the antenna configuration and the transmission diversity scheme used by BS 44. Based on the assumption, the mobile terminal can select an associated mask and de-mask the CRC bits. If the de-masked CRC bits match with a CRC check of the PBCH, then it can be determined that a proper assumption with regard to the antenna configuration and transmission diversity scheme of BS 44 has been made. Otherwise, if the de-masked CRC bits do not match with a CRC check of the PBCH, then it can be determined that an improper assumption with regard to the antenna configuration and transmission diversity scheme of BS 44 has been made and other assumptions can be attempted.

For more information regarding masking of bits with respect to antenna configurations and/or transmission diversity schemes, see U.S. patent application Ser. No. 11/969,794, entitled *Method and Apparatus for Conveying Antenna Configuration Information*, filed Jan. 4, 2008 which is hereby incorporated by reference in its entirety.

Figure 3A:
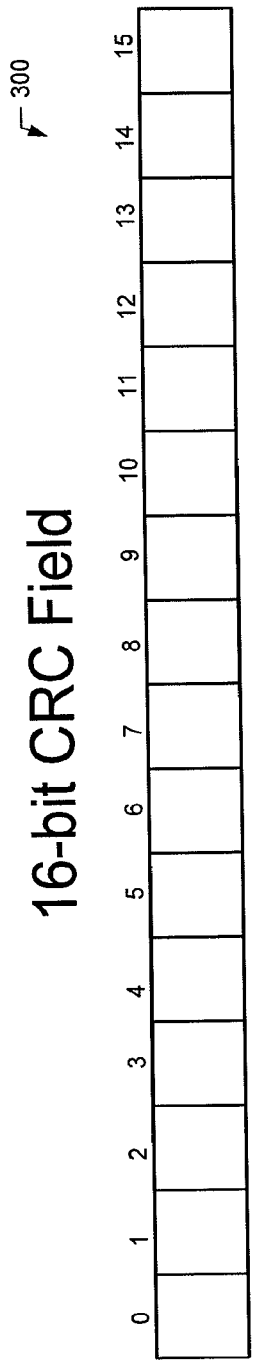
FIG. 3a is a diagram of an example 16-bit CRC field according to an embodiment of the present invention.

FIG. 3a depicts an example 16-bit CRC field according to various embodiments of the invention. The CRC field 300 can include sixteen bits (0 through 15) of information and can be used to check the accuracy of the data associated with the CRC bits. In some embodiments, the data within a PBCH can be used to determine the CRC bits and the CRC bits can be transmitted together with the PBCH. While the example CRC field 300 is a 16-bit field, it is contemplated that any number of CRC bits could be used in various embodiments of the present invention. The CRC bits which populate the CRC field can be used to ensure the integrity of the data in the PBCH. However, various embodiments of the present invention apply masks to the CRC bits to thereby impart information regarding the antenna configuration and the transmission diversity scheme of a base station, or eNodeB, to the mobile terminal without the need for additional communications overhead, such as by communicating additional bits of information.

Prior to applying a mask to the CRC bits, the mask can first be developed. In a conventional E-UTRAN system, three antenna configurations and associated diversity schemes can be utilized. E-UTRAN systems can include a single antenna configuration with no transmission diversity, a two antenna configuration applying space frequency block code (SFBC) transmit diversity, and a four antenna configuration applying SFBC frequency switched transmit diversity (FSTD). While the examples described herein are applied to E-UTRAN systems with three antenna configurations and associated diversity schemes, it is contemplated that embodiments of the present invention can be utilized in other systems and/or systems with any number of antenna configurations and associated diversity schemes. As such, when applied to a conventional E-UTRAN system, embodiments of the present invention can involve the creation of three masks associated with each of the three E-UTRAN antenna configurations and associated transmit diversity schemes.

In determining the content of the masks to be applied to the CRC bits, the hamming distance between each of the masks can be considered. A hamming distance can describe the number of substitutions or other operations that need to be undertaken to convert a first entity, such as a first bit sequence, into a second entity, such as a second bit sequence. For example, a first bit sequence containing 1111 and a second bit sequence 0000, have a hamming distance of four because it would take four operations to change the four ones in the first bit sequence to zeros to generate the second bit sequence. The hamming distance would also be four if operations were performed on the second bit sequence in order to generate the first bit sequence. Due to the potential for noise in wireless communications, in some situations, it may be beneficial to increase and/or maximize the hamming distance between two masks to reduce the likelihood that noise could corrupt the CRC bits in such a manner that create situations where an incorrect mask can result in an proper CRC check result.

Figure 3B:
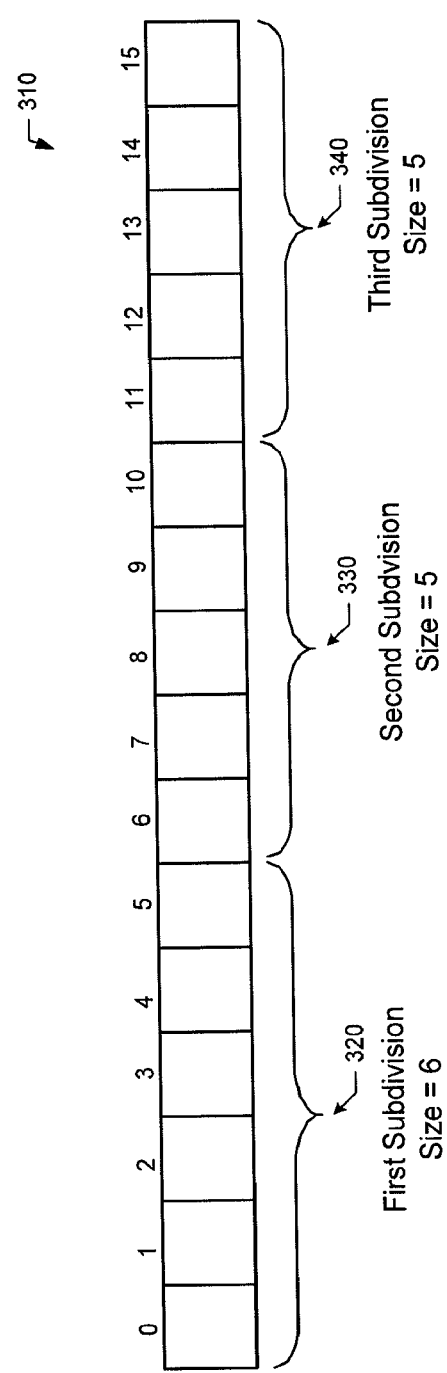
FIG. 3b is a diagram of an example subdivided 16-bit CRC field according to an embodiment of the present invention.

Thus, in embodiments applied to a conventional E-UT-RAN system three masks can be developed where the hamming distances between the masks are considered. One manner of developing three masks, according to various embodiments of the invention, can be described with respect to FIG. 3b. FIG. 3b depicts an example 16-bit CRC field 310 which has been separated into three subdivisions, namely first subdivision 320, second subdivision 330, and third subdivision 340. In the example CRC field 310, the first subdivision contains 6 bits, the second subdivision contains 5 bits and the third subdivision contains 5 bits. Note that the number of subdivisions and the number of bits contained within each subdivision of CRC field 310 is merely exemplary and any number of subdivisions and any number of bits with each subdivision can be utilized, so long as every bit location within the CRC field is contained within only one subdivision.

In various embodiments, a first mask MASK1 can be an all zero mask. In some respects, all zero masks can be preferable because the application of the mask to a subject bit sequence results in a bit sequence identical to the subject bit sequence. As such, in some embodiments, in order to minimize computational overhead, an all zero bit sequence need not have a mask applied thereto since the result is identical to the subject. Similarly, in some embodiments, it may be beneficial to define a mask that contains all ones, since computationally an all one mask would only require a bitwise swapping of the bit values in the sequence, which may also reduce computational overhead with respect to the masking and de-masking process.

Further, in consideration of the hamming distances involved, in this case to result in substantially equal hamming distances, a second mask MASK2 can be generated, according to various embodiments, by populating the first subdivision 320 with ones. The second subdivision 330 can be populated with ones. Finally, the third subdivision 340 can be populated with zeros. In this same regard, in order to generate the third mask MASK3, the first subdivision 320 can be populated with ones, the second subdivision 330 can be populated with zeros, and the third subdivision 340 can be populated with ones. The resulting masks generated from this process can be as follows:

MASK1=0000000000000000
MASK2=1111111111100000
MASK3=1111110000011111

With a set of masks generated, the hamming distance between each of the masks can be evaluated. One method of determining the hamming distance between two masks is to sum the number of bits in each subdivision that are different. Therefore, in this example, the hamming distance between MASK1 and MASK2 can be determined by adding the bit length of the first subdivision, i.e. 6, with the bit length of the second subdivision, i.e. 5, since all bits of the first and second subdivisions are different between the masks and all bits in the third subdivision are the same between the masks. As such, the hamming distance between MASK1 and MASK2 is 11. Similarly, the hamming distance between MASK1 and MASK3 can be determined by adding the bit length of the first subdivision, i.e. 6, with the bit length of the third subdivision, i.e. 5, since all bits of the first and third subdivisions are different between the masks and all bits in the second subdivision are the same between the masks. As such, the hamming distance between MASK1 and MASK3 is 11. Finally, the hamming distance between MASK2 and MASK3 can be determined by adding the bit length of the second subdivision, i.e. 5, with the bit length of the third subdivision, i.e. 5, since all bits of the second and third subdivisions are different between the masks and all bits in the first subdivision are the same between the masks. As such, the hamming distance between MASK1 and MASK3 is 10. The hamming distance between two masks can also be calculated by taking the exclusive-or of two masks and then counting the ones in the result. The masks can also be associated with the antenna configurations and transmission diversity schemes such that MASK1 is associated with the one antenna configuration, MASK2 is associated with the two antenna configuration and MASK3 is associated with the four antenna configuration. In this regard the hamming distances between the three masks can be described as 11-11-10, or xy-z, where x is the hamming distance between the single antenna configuration mask and the second antenna configuration mask, y is the hamming distance between the single antenna configuration mask and the four antenna configuration mask, and z is the hamming distance between the two antenna configuration mask and the four antenna configuration mask.

With regard to selecting masks based on the hamming distances between the masks, additional factors can be considered. For example, studies of conventional EUTRAN systems indicate that false detections, i.e. situations where incorrect assumptions regarding antenna configuration and transmission diversity scheme are not identified, most readily occur in situations where a single antenna configuration was erroneously selected and the eNodeB utilizes a two antenna configuration, and situations where a two antenna configuration was erroneously selected and the eNodeB utilizes a single antenna configuration. Further, the probability of false detects between a one antenna configuration and the four antenna configuration is higher than the probability of false detects between the two antenna configuration and the four antenna configuration. As such, in some embodiments of the invention, it may be desirable to select mask sets having hamming distances between the masks in accordance with these statistics so as to increase the likelihood that incorrect assumptions are identified. In this regard, according to various embodiments, a set of masks can be developed such that the largest hamming distance can be between the one antenna configuration mask and the two antenna configuration mask. The second largest hamming distance can be between the one antenna configuration mask and the four antenna configuration mask, and the smallest hamming distance can be between the two antenna configuration mask and the four antenna configuration mask. As such, with respect to the 11-11-10 example provided above, the hamming distances tend conform to the concerns raised with respect to the probabilities.

Further, using the same process as described above, various additional sets of masks can be generated where a desired hamming distance description can be achieved. For example, a set of masks can be generated where the bit length of the first subdivision is 8, the bit length of the second subdivision is 4 and the bit length of the third subdivision is 4. Using the same process as described above with respect to placement of ones and zeros within the subdivisions, the result is a mask set described as 12-12-8. Additionally, using the same method, but where the bit length of first subdivision is 10, the bit length of the second subdivision is 3 and the bit length of the third subdivision is 3, a mask set can be determined that is described as 13-13-6.

An additional factor that may be considered in various embodiments is that noise in wireless systems tends to corrupt blocks of bits in a sequence. This is often true with respect to sequences that use convolutional encoding, such as the PBCH. In other words, bit errors are typically not distributed over the entire set of coded bits, but are often concentrated in a block or burst of erroneous bits, i.e. all errors are often within a small distance from each other. If as result of corruption to the bits, an incorrect mask becomes a correct match, a false detect is likely to occur. To minimize the potential for this situation, in some embodiments, it may be desirable to distribute the bits that have different values between the various masks across the entire mask, rather that having large portions of the masks being substantially similar. In this regard, in some embodiments, a difference of at least one bit can be present within a predetermined block of bits within the sequence. For example, in blocks of two bits each bit can be different or in blocks of four bits the third bit can be different, and so on. Additionally, the bits within each block need not maintain the same pattern. In this regard, a set of masks can be evaluated on a bit by bit basis in order to ensure diversity between the bit locations in each mask. In this manner, the potential for block corruption to result in false detection is reduced, but the hamming distances between the masks are maintained. For example, consider a set of masks defined as follows:

MASK1=0000000000000000
MASK2=1111111111111111
MASK3=0000000011111111

The mask set can be described as 16-8-8 with respect to hamming distances. However, it should be noted that a block corruption of the first eight bits of MASK3 can result in a likely false detection with respect to MASK2. A similar situation results with a block corruption of the last eight bits of MASK3 resulting in a likely false detection with respect to MASK1.

However, if the ones and zeros in MASK3 are spread across MASK3 on a bit by bit basis to create diversity between the bit locations of each mask, the following set of masks can be generated having the same 16-8-8 hamming description:

MASK1=0000000000000000
MASK2—1111111111111111
MASK3=0101010101010101

Note that the modification to MASK3 requires corruption of almost the entire bit length of the mask in order to result in a likely false detection. It is also noteworthy to consider that this set of masks also satisfies the considerations with respect to the probabilities between the various E-UTRAN antenna configurations, where MASK1 is associated with the one antenna configuration, MASK2 is associated with the two antenna configuration and MASK3 is associated with the four antenna configuration. In this regard, the 16-8-8 hamming description indicates a maximum hamming distance between the single antenna and the two antenna configuration, which has been shown to be the most problematic with respect to false detections. Similarly, MASK3 could be replaced with 1010101010101010 and the same hamming distances and diversity would be present in the mask set.

In this regard, it can be seen that an alternating one-zero or zero-one pattern is the optimal diversity within a single mask. However, masks containing additional ones or zeros can result in identical bit values being adjacent. One means of generating masks having a maximum diversity between the bits, but still including more than eight ones or eight zeros, can be to begin with an all zero mask and two identical masks having an alternating pattern, e.g. 1010101010101010. With respect to the two identical alternating pattern masks, one or more ones can be inserted into positions in the first mask and the same number of zeros can be inserted into the same positions in the second mask, such that the placement of the newly introduced bits are evenly distributed or as even as possible throughout the bit sequence. Subsequently, the excess bits on the end or beginning of the sequences can be removed. In a similar manner, the beginning or ending bits can be removed prior to the evenly distributed insertion of the new bits into the masks. Further, as a check, in embodiments where one mask is an all zero mask, an indication of the diversity between the other two masks can be determined by taking the logical exclusive-or between the two masks and analyzing the result for diversity between the bits.

In consideration of the false detection probabilities and the concerns with respect to diversity of bits, additional mask sets can be generated where, for example the hamming distance between the first mask and the second mask is larger relative to the other hamming distances, and maximum diversity between the bits of the masks is maintained. An additional example can have a 14-9-9 hamming description and include bit diversity. In this regard, the following mask set can be generated.

MASK1=0000000000000000
MASK2=1111011111110111
MASK3=0101101010101101

Similarly, the following mask set can be generated satisfying the same conditions.

MASK1=0000000000000000
MASK2=1110111111111011
MASK3=0101101010101101

In some embodiments, these mask sets may also be desirable because studies have shown that the incremental reduction in false detections as hamming distances exceed 8 is not as substantial. As such, in some embodiments, it may be desirable to reduce the hamming distance between MASK1 and MASK2, i.e. the single antenna to two antenna configuration hamming distance, in order to increase the hamming distances between MASK1 and MASK3, and MASK2 and MASK3. In some embodiments, a difference of less than predefined number, such as two or three, between the hamming distances of the masks can be utilized. In this regard, an additional mask set possibility, that results in a more balanced design can be described as 12-10-10. A mask set having this hamming distance description can be as follows:

MASK1=0000000000000000
MASK2=1011101110111011
MASK3=0110110101101101

In addition to the generation of various mask sets according to the above described factors, in some embodiments of the present invention, a determined mask set can be manipulated to generate a new set of masks, where the new set of masks maintain some or all of the characteristics of the original mask set. In some embodiments, manipulations of mask sets may be desirable for various reasons. One reason may be that in situations where low signal power is present or where other types of distortions occur such as, for example, Directed Current offset (DC offset) a signal may appear to be an all zero signal after demodulation. In this regard, after decoding, an all zero sequence may occur, which may also correspond to an all zero CRC. As such, false detections may occur in these situations where an all zero mask is used. As such, in some embodiments, it may be beneficial to manipulate a mask set that considers the factors discussed above and has an all zero mask. In this way it may be possible to generate a set of masks that does not include an all zero mask but maintains the hamming distance description and diversity of the original mask set.

According to some embodiments, a scrambling mask can be used to convert an original set of masks into a new set of masks having the same hamming distances and diversity features. A scrambling mask can be a sequence of bits, equivalent in bit length to the length of the masks, where the scrambling mask is applied to each mask in the set to generate a new set of masks. In some embodiments, the application of a scrambling mask can include performing an exclusive-or logical function on the original mask using the scrambling mask to generate a new mask. The process can then be repeated for each of the remaining original masks in the set.

For example, consider applying the scrambling mask 0011001100110011 to the following mask set using an exclusive-or logical function where the following mask set can be described as 16-8-8.

SCRAMBLING MASK=0011001100110011
MASK1=0000000000000000
MASK2=1111111111111111
MASK3=0101010101010101

The resultant mask set would be as follows, where the exclusive-or of each bit of each mask is taken using the associated bit in the scrambling mask.

MASK1=0011001100110011
MASK2=1100110011001100
MASK3=0110011001100110

Note that the resultant mask set maintains the 16-8-8 description, but the bits have been manipulated to generate a new mask set. Also, note that the all zero mask has been eliminated from the mask set. With regard to eliminating an all zero mask from the set of masks, it may be considered, as described earlier, that the application of an all zero mask requires no computational overhead since the resultant mask is an identity of the subject mask. In this regard, it may be desirable to select a scrambling mask that is equivalent to an existing mask in the set. By doing so, upon application of the scrambling mask to the set, the result of applying the scrambling mask to the identical mask can result in an all zero mask. If for example it is expected that a four antenna case will be the predominant mode of operation, it may be beneficial to select an all zero mask for the four antenna case in order to enjoy the complexity reduction for the all zero mask as often as possible.

Additionally, in some embodiments, a permutation or interleaving function can be applied to a set of masks in order to generate a new set of masks having similar attributes as the original masks, but resulting in differing bit sequences. In this regard, the permutation or interleaving function can perform bitwise rearrangement of the mask set to generate a new mask set. In some embodiments, permuting or interleaving the mask set can result in a mask set having the same hamming description, but may result in a mask set having a different diversity between the bits. For example, a circular interleaver function can move the last bit(s) of each mask in a set to the first bit position(s) and shift the remaining bits to the next highest bit position(s). Note that the resultant mask set will maintain the same hamming distance description, but the diversity between the bits of the masks may be affected. As such, in some embodiments, a permutation or interleaving function can be used to generate masks having differing diversities between the bits, while maintaining the hamming distance description associated with the original mask set.

Figure 4:
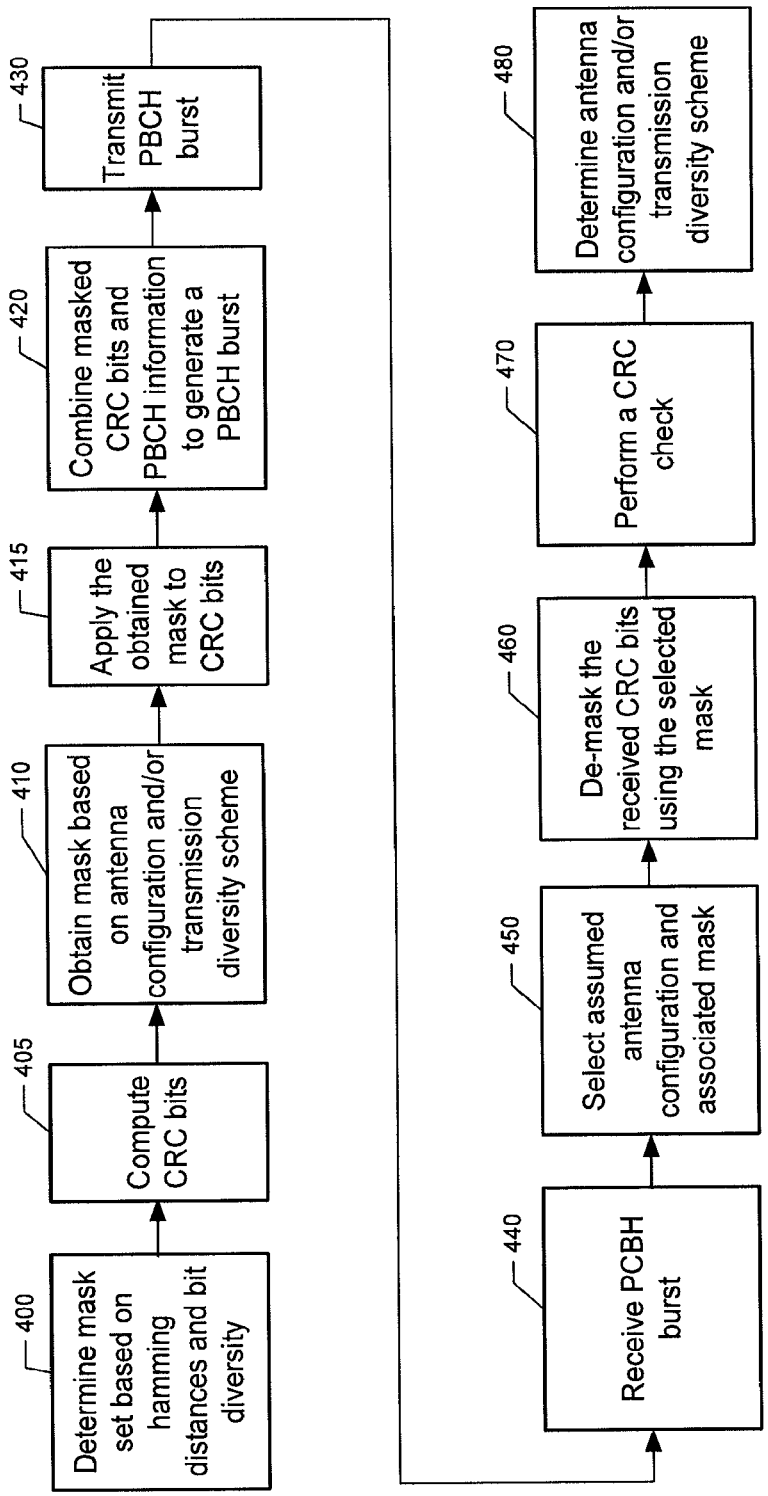
FIG. 4 is a flowchart of information transmission procedure according to an embodiment of the present invention.

FIG. 4 is a flowchart of a PBCH transmission and reception procedure in accordance with an embodiment of the present invention. The procedure of FIG. 4 is directed toward the use of a mask on CRC bits, to impart antenna configuration information and may be utilized to verify that a correct antenna configuration has been identified by the user equipment.

In short, a different mask is predefined for each different antenna configuration and/or transmission diversity scheme, such as a first mask for a one antenna configuration, a second mask for a two antenna configuration utilizing SFBC and a third mask for a four antenna configuration utilizing FSTD. At least some of the bits transmitted by the network entity, such as the base station 44, and received by the user equipment are masked with the mask associated with the particular antenna configuration of the network entity. In one embodiment, bits of the PBCH may be masked. More particularly, the PBCH is typically comprised of information bits and CRC bits that are computed based upon the information bits to permit verification of the information bits. In this embodiment, the CRC bits may be masked.

In one embodiment in which the CRC bits are masked, the PBCH transmission and reception procedure of FIG. 4 can comprise determining a mask set based on hamming distances and bit diversity at 400, computing bits, such as, for example, CRC bits at 405, obtaining a mask based on an antenna configuration and/or a transmission diversity scheme of a network entity, e.g., base station or eNodeB at 410, applying the obtained mask to the bits at 415, combining the masked bits and PBCH information bits to generate a PBCH burst at 420 and transmitting the PBCH burst at 430. As also shown in FIG. 4, after transmission, the user equipment can receive the PCBH burst at 440 and then determine the mask that was utilized prior to verifying the information bits by, in some embodiments, performing a CRC check with the de-masked CRC bits. In one embodiment, the mask is determined by selecting an assumed antenna configuration and/or transmission diversity scheme, and an associated mask at 450 and then de-masking the received bits using the selected mask at 460 prior to analyzing the received bits at 470 and determining the antenna configuration and/or transmission diversity scheme at 480. Based upon the mask that is determined by the user equipment to have been utilized at the base station, antenna configuration information associated with the mask may be determined to permit the information bits to be correctly and reliably demodulated and/or to permit a prior assumption regarding the antenna configuration to be verified.

At 400, a set of masks can be determined according one of the various embodiments described above. The set of masks can be determined by any entity, i.e. an entity connected to a communications network or otherwise. Additionally, regardless of the entity which determines the set of masks, in some embodiments, the appropriate mask for a particular base station, that is the mask associated with the base station's antenna configuration and transmission diversity scheme, can be known to the base station, and the entire set of available masks can be known by mobile terminals. The set of masks can be determined based on the hamming distances between the masks, the diversity between the bits, or a combination of both. Further, in some embodiments, the set of masks can be determined based upon factors such as computational overhead, the probability of false detections, and the likelihood of block bit corruption. In some embodiments, a set of masks can be determined, where each mask within the set of masks is associated with an antenna configuration and a transmission diversity scheme. In some embodiments, a mask can be determined such that, when applied, one of at least three different antenna configurations and/or transmission diversity schemes can be uniquely distinguished. Additionally, the determined set of masks and the mask's associations with antenna configurations and transmission diversity schemes can be known not only by the base station, but by the user equipment with which the base station will communicate. In some embodiments, the determined masks can be stored on the user equipment prior to any communications between the base station and the user equipment, such as during the initial configuration of the user equipment. As such, when data is received by the user equipment, the user equipment can also select from the same set of masks. In some embodiments, the mask can be a bit mask with a sequence of equal length to the number of bits to be masked, such as, for example, the number of CRC bits associated with the PBCH.

At 405, bits can be computed, such as, for example, CRC bits. The CRC bits can be computed with respect to the information bits of the PBCH. A CRC of the PBCH can be computed using any known technique. The CRC bits can be computed by a base station, such as BS 44, a computing device connected to a base station, or any other means.

At 410, a mask can be obtained from the set of masks determined at 400. The mask can be obtained from the determined set of masks where each mask in the set of masks can be associated with a different antenna configuration and/or a different transmission diversity scheme. In some embodiments, a mask can be obtained such that, when applied, at least three different antenna configurations and/or transmission diversity schemes can be uniquely distinguished. Since masks within the predetermined set of masks can be associated with different antenna configurations and transmission diversity schemes, in some embodiments, a mask can be obtained based on the antenna configuration and transmission diversity scheme of the base station.

At 415, the bits can be masked by applying the determined mask to the bits. Application of the mask at 410 to, for example, the CRC bits can be performed using any known technique, such as via an exclusive-or logical operation. Since, in some embodiments, the mask is selected based upon the antenna configuration and/or the transmission diversity scheme, the application of the mask can impart information into the result regarding at least one of the antenna configuration and/or the transmission diversity scheme. While this exemplary embodiment of the invention is directed toward application of the obtained mask to CRC bits, it is contemplated that embodiments of the invention may be applied to any sequence of bits. In some embodiments, the obtained mask can be applied to bits within the PBCH.

At 420, the masked bits can be combined with PBCH information to generate a PBCH burst. In some embodiments, the masked CRC bits can be appended to PBCH information bits after being masked. In other embodiments, the application of the CRC mask, at 410, can occur after the CRC bits have been appended to the PBCH information bits. Further, in some embodiments, at 420, a forward error correction (FEC) encoding operation can be undertaken that operates on the PBCH information bits and the masked CRC bits. The PBCH information bits and the masked CRC bits can be encoded at a low code rate such as, for example, one-ninth. In some embodiments, the masking can be performed after FEC, which can result in masking the encoded data in an antenna configuration in a specific way, sometimes called scrambling.

Additionally at 420, channel coding and rate matching can be performed. In this regard, in some embodiments, masking of the bits can occur after either channel coding or rate matching, since all these are linear operations. Since channel coding and rate matching may have an effect on the values of the bits that are to be masked, such as the CRC bits of the PBCH, the mask to be used may be altered according to various embodiments, such as, by using a scrambling function or a permutation or interleaving function. In this manner, determination and application of a mask will also consider the effects of channel coding and/or rate matching on the bits which will ultimately be transmitted. In this manner the hamming distances between a determined set of masks, and as such the mask to be applied, can be determined by taking the affects of channel coding and or rate matching into account. In this manner, a set of masks may be selected where the hamming distances and bit diversity are considered with respect to how the masks will be affected by channel coding and/or rate matching.

For example, let us assume a very simple channel encoder that adds a parity bit between each of the data bits in a sequence. After the addition of the parity bits, the all zero mask can still include only zeros. A mask of all ones, which has the best hamming distance before encoding, relative to the all zero mask, is encoded into a mask of 1010101 . . . by this encoder. The mask 10101 . . . however, which has a poorer hamming distance before encoding, is coded into 1101110111 . . . and then has a better hamming distance after coding than the all one mask. This example makes evident that hamming distances between masks may be different before and after encoding and therefore can be optimized differently before or after encoding. Obviously encoders that are used may be more complex than in this simple example, but the principle stays the same. Similarly, puncturing will take away some of the encoded bits and also may affect hamming distances and bit diversities of different masks differently. As such, desirable hamming distances and bit diversities can be achieved with respect to bits immediately prior to transmission, where the likelihood of data corruption is high. Similarly, in this regard, masks can be developed and applied after channel coding and/or rate matching, if the mask used is, for example, an encoded mask. Similarly, in some embodiments, masks can be developed and applied prior to channel coding and/or rate matching when the masks take into consideration the affects that channel coding and/or rate matching take upon the resulting bit sequence to be transmitted. In some embodiments, in order to determine a mask set having desirable hamming distances after channel coding and/or rate matching, a search of all the potential masks can be undertaken, a significant number of masks can be selected at random, or masks may be selected that have at least a decent hamming distance before encoding. In this regard, masks having desirable hamming distances can be selected from that set. Further, the mask set can be determined according to any other embodiment of the invention as described herein.

At 430, the PBCH burst can be transmitted. The PBCH burst can be transmitted by a base station, such as BS 44, or other means. In some embodiments, the PBCH burst can be transmitted in the form of four self-decodable bursts. In some embodiments, transmission of the PBCH burst can include mapping the resource elements reserved for the PBCH and sending the PBCH burst over an air interface according to the antenna configuration and the transmission diversity scheme that are associated with the determined mask. Further, in some embodiments, modulation of the PBCH burst, and transmission diversity encoding can also be performed at 430.

At 440, user equipment, such as mobile terminal 10, or other means can receive the PBCH burst. In some embodiments, the PBCH burst can be received in the form of four self-decodable bursts. In some embodiments, the operations subsequent to receiving the PBCH burst at 440 can be implemented in a minor fashion, for example, in a mobile terminal, to those implemented by, for example, a base station, with respect to operations 405, 410, 415 and 420. At 450, an antenna configuration and/or transmission diversity scheme can be assumed and an associated mask (that is, associated with the assumed antenna configuration and transmission diversity scheme) can be selected from a predetermined set of masks. Demodulation of the PBCH burst can be accomplished by utilizing the assumed antenna configuration information at 450. In some embodiments, the assumption can be to use the most robust antenna configuration, that is, the configuration with the most antennas, to perform the demodulation. Further, in some embodiments, based on resource element mapping, an assumed antenna configuration may be determined. In embodiments where FEC encoding occurred, the user equipment can perform FEC decoding after performing a demodulation. Further, in some embodiments, channel decoding and rate matching, can also be performed by the user equipment at 450.

At 460, the user equipment can de-mask the received bits. The de-masking operation can utilize the mask that is associated with the assumed antenna configuration of the base station. In some embodiments, the de-masking operation can be applied to the masked bits, such as the masked CRC bits, by using any known technique, such as via an exclusive-or logical operation.

At 470, an analysis of the received bits can be performed to determine which mask was utilized to mask the bits prior to transmission. In some embodiments, the analysis of the received bits can comprise performing a CRC check of the bits. In some embodiments, a CRC can be computed from the received PBCH information bits. The CRC bits computed from the received PBCH information bits can then be compared to the de-masked CRC bits as part of the analysis. In some embodiments, the comparison can be performed by taking the exclusive-or of the de-masked CRC bits and the CRC bits computed by the user equipment from the received PBCH information bits. In other embodiments, the analysis can include performing a comparison between the CRC bits that have been computed by the user equipment and the received CRC bits that are still masked, such as by performing an exclusive-or operation. In this regard, if the result of an exclusive-or operation is, i.e., matches, the mask associated with the assumed antenna configuration and transmission diversity scheme, then the assumption regarding the antenna configuration information is correct and it is determined which one of the plurality of predefined bit masks was applied to the bits.

At 480, the antenna configuration and/or transmission diversity scheme can be determined. If a match results from the analysis at 470, then the mask used to mask the bits is known and it can be determined that the proper antenna configuration information was assumed by the user equipment. As such, when, in some embodiments, the CRC check results in a match, the antenna configuration and/or transmission diversity scheme selected by the user equipment can be considered highly reliable.

If the result of the analysis at 470 finds no match, then to determine the antenna configuration and/or the transmission diversity scheme, in some embodiments, the procedure can revert back to operation 450 and a demodulation of the PBCH burst can occur using a different mask and as such, a different assumed antenna configuration information. In other embodiments, if the result of the analysis at 470 finds no match, then the procedure can revert back to operation 460, and a different mask can be used to de-mask the CRC bits. In this regard, no additional demodulation of the received PBCH burst is performed. Further, in some embodiments where the masking of CRC bits is utilized, calculating the CRC with different masks can be implemented very efficiently. First, the CRC can be calculated without any mask, that is, equivalently with a mask containing all zeros. If the CRC turns out to be all zeros, then an all zero mask has been used and the corresponding antenna configuration can be determined. Otherwise, the CRC can be compared with the other possible masks. If a match results from these comparisons, then the corresponding antenna configurations can be determined. Note that in this embodiment it may not be necessary to re-calculate the CRC for different masks. In particular, it may not be necessary to run all the data bits through the CRC generator polynomial, which can be a complex part of the CRC generation. As such, only a simple comparison of the CRC result with the set of predefined masks may be necessary, which can be a very simple operation.

Further, in some embodiments, where no match is found, a decision to revert back to the demodulation operation 450 or to simply de-mask the CRC bits with a different mask at 460 can be based on the signal-to-noise ratio. In situations where the signal-to-noise ratio is high, merely reverting back to de-masking the bits may be more efficient, however, when the signal-to-noise ratio is low, reverting back to demodulation of the PBCH burst using a new assumption may be more effective. According to various embodiments, other factors, such as processing complexity, may be considered when determining whether to revert back to demodulation using a new assumption, which can result in taking on additional processing, or to revert back to de-masking using a new assumption, which can result in relatively less processing. In a further embodiment, the CRC bits can be first de-masked with a different mask at 460, and if this is not successful then it can be decided to revert back to the demodulation operation at 450. Regardless of the reversion to operation 450 or 460, this procedure can be repeated until a match is found which defines the antenna configuration and the transmission diversity scheme.

In another embodiment, the functionality described above with respect to transmission of data can be implemented as an apparatus. The apparatus can include a processor configured to determine a mask set based on hamming distances and bit diversity such that, for example, the hamming distances between the masks are maximized and the diversity between the bits of the masks are maximized. In some embodiments, hamming distances and bit diversities may also be considered with respect to probabilities of false detections and the likelihood of block bit corruption. Further, the processor can be configured to compute bits, such as, for example, CRC bits, obtain a mask based on an antenna configuration and/or a transmission diversity scheme of a network entity and apply the obtained mask to the bits. Additionally, the processor can be further configured to combine the masked bits and PBCH information bits to generate a PBCH burst and provide for transmitting the PBCH burst.

In another embodiment, the functionality described above with respect to reception of data can be implemented as an apparatus. The apparatus can include a processor configured to receive the PCBH burst and then select an assumed antenna configuration and/or transmission diversity scheme, and an associated mask. The processor can be configured to select a mask from a set of masks where the masks are determined based on hamming distances and bit diversity such that, for example, the hamming distances between the masks are maximized and the diversity between the bits of the masks are maximized. The processor can be configured to select a mask from a set of masks where the masks are determined based on hamming distances and bit diversity such that the hamming distances and bit diversities are considered with respect to probabilities of false detections and the likelihood of block bit corruption. Further, the processor can be further configured to de-mask the received bits using the selected mask prior to analyzing the received bits and determining the antenna configuration and/or transmission diversity scheme. Additionally, the processor can be configured to determine which antenna configuration and transmission diversity scheme was utilized to transmit the received burst by determining which mask was utilized prior to transmitting the PBCH burst.

In another embodiment, the functionality described above with respect to transmission of data can be implemented as a method. The method can include determining a mask set based on hamming distances and bit diversity such that, for example, the hamming distances between the masks are maximized and the diversity between the bits of the masks are maximized. In some embodiments, hamming distances and bit diversities may also be considered with respect to probabilities of false detections and the likelihood of block bit corruption. Further, the method can include computing bits, such as, for example, CRC bits, obtaining a mask based on an antenna configuration and/or a transmission diversity scheme of a network entity and applying the obtained mask to the bits. Additionally, the method can include combining the masked bits and PBCH information bits to generate a PBCH burst and providing for transmission of the PBCH burst.

In another embodiment, the functionality described above with respect to reception of data can be implemented as a method. The method can include receiving the PCBH burst and selecting an assumed antenna configuration and/or transmission diversity scheme and an associated mask. The method can further include selecting a mask from a set of masks where the masks are determined based on hamming distances and bit diversity such that, for example, the hamming distances between the masks are maximized and the diversity between the bits of the masks are maximized. Additionally, the method can further include selecting a mask from a set of masks where the masks are determined based on hamming distances and bit diversity such that the hamming distances and bit diversities are considered with respect to probabilities of false detections and the likelihood of block bit corruption. Further, the method can include de-masking the received bits using the selected mask prior to analyzing the received bits and determining the antenna configuration and/or transmission diversity scheme. Additionally, the method can include determining which antenna configuration and transmission diversity scheme was utilized to transmit the received burst by determining which mask was utilized prior to transmitting the PBCH burst.

According to one aspect of the present invention, the network entity, such as base station 44, and the user equipment, such as mobile terminal 10, which implement embodiments of the present invention generally operates under control of a computer program product. The computer program product for performing the methods of embodiments of the present invention includes a computer-readable storage medium and computer-readable program code portions, such as a series of computer instructions, embodied in the computer-readable storage medium.

In this regard, FIG. 4 is a flowchart of methods, apparatuses and program products according to exemplary embodiments of the present invention. It will be understood that each block or step of the flowchart, and combinations of blocks in the flowchart, can be implemented by computer program instructions. These computer program instructions may be loaded onto a computer or other programmable apparatus, such as a processor, e.g., controller 20 associated with mobile terminal 10 or a processor associated with the BS 44, to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart supports combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:
   selecting a bit mask associated with an antenna configuration and a transmission diversity scheme, the bit mask being selected from a set of bit masks, the set of bit masks including a first bit mask associated with a single antenna configuration, a second bit mask associated with a two antenna configuration, and a third bit mask associated with a four antenna configuration, wherein a hamming distance between the first bit mask and the second bit mask is larger than the hamming distance between the first bit mask and the third bit mask and also larger than the hamming distance between the second bit mask and the third bit mask; and
   applying, with a processor, the bit mask associated with the antenna configuration and the transmission diversity scheme to cyclic redundancy check bits.

2. The method of claim 1, wherein applying the bit mask includes applying the bit mask to the cyclic redundancy check bits included within a physical broadcast channel (PBCH).

3. The method of claim 1, wherein the first bit mask is 0000000000000000, the second bit mask is 1111111111111111, and the third bit mask is 0101010101010101.

4. The method of claim 1, wherein the first bit mask is an all zero mask and the second bit mask is an all one mask; and wherein each digit of the third bit mask has an opposite bit value from an adjacent digit.

5. The method of claim 1, wherein applying the bit mask includes applying the bit mask to de-mask the cyclic redundancy check bits; and wherein the method further comprises performing a cyclic redundancy check (CRC) on information bits associated with the de-masked cyclic redundancy check bits, and determining whether a correct mask was selected based on the CRC.

6. The method of claim 1, further comprising receiving a plurality of bits including a masked set of cyclic redundancy check bits and information bits associated with the cyclic redundancy check bits; and wherein applying the bit mask includes applying the bit mask to de-mask the received, masked set of cyclic redundancy check bits; and wherein the method further comprises performing a cyclic redundancy check (CRC) on the information bits associated with the cyclic redundancy check bits, and determining whether a correct mask was selected based on the CRC.

7. The method of claim 1, further comprising channel coding the cyclic redundancy check bits and information bits associated with the cyclic redundancy check bits after applying the bit mask to the cyclic redundancy check bits.

8. The method of claim 1, wherein applying the bit mask to the cyclic redundancy check bits comprises applying the bit mask to the cyclic redundancy check bits without application of the bit mask to corresponding information bits upon which the cyclic redundancy check bits are based.

9. A apparatus comprising a processor and a memory including computer program code, the memory and the computer program code configured to, with the processor, cause the apparatus to:
select a bit mask associated with an antenna configuration and a transmission diversity scheme, the bit mask being selected from a set of bit masks, the set of bit masks including a first bit mask associated with a single antenna configuration, a second bit mask associated with a two antenna configuration, and a third bit mask associated with a four antenna configuration, wherein a hamming distance between the first bit mask and the second bit mask is larger than the hamming distance between the first bit mask and the third bit mask and also larger than the hamming distance between the second bit mask and the third bit mask; and
apply the bit mask associated with the antenna configuration and the transmission diversity scheme to cyclic redundancy check bits.

10. The apparatus of claim 9, wherein the apparatus being caused to apply the bit mask includes being caused to apply the bit mask to the cyclic redundancy check bits included within a physical broadcast channel (PBCH).

11. The apparatus of claim 9, wherein the first bit mask is 0000000000000000, the second bit mask is 1111111111111111, and the third bit mask is 0101010101010101.

12. The apparatus of claim 9, wherein the first bit mask is an all zero mask and the second bit mask is an all one mask; and wherein each digit of the third bit mask has an opposite bit value from an adjacent digit.

13. The apparatus of claim 9, wherein the apparatus being caused to apply the bit mask includes being caused to apply the bit mask to de-mask the cyclic redundancy check bits; and wherein the apparatus is further caused to perform a cyclic redundancy check (CRC) on information bits associated with the de-masked cyclic redundancy check bits, and determine whether a correct mask was selected based on the CRC.

14. The apparatus of claim 9, wherein the apparatus is further caused to receive a plurality of bits including a masked set of cyclic redundancy check bits and information bits associated with the cyclic redundancy check bits, and wherein the apparatus being caused to apply the bit mask includes being caused to apply the bit mask to de-mask the received, masked set of cyclic redundancy check bits; and wherein the apparatus is further caused to perform a cyclic redundancy check (CRC) on the information bits associated with the cyclic redundancy check bits, and determine whether a correct mask was selected based on the CRC.

15. The apparatus of claim 9, wherein the apparatus is further caused to channel code the cyclic redundancy check bits and information bits associated with the cyclic redundancy check bits after applying the bit mask to the cyclic redundancy check bits.

16. The apparatus of claim 9, wherein the apparatus being caused to apply the bit mask to the cyclic redundancy check bits includes being caused to apply the bit mask to the cyclic redundancy check bits without application of the bit mask to corresponding information bits upon which the cyclic redundancy check bits are based.

17. A non-transitory computer program product comprising a computer-readable medium bearing computer program code embodied therein for use with a computer, the computer program code comprising:
code for selecting a bit mask associated with an antenna configuration and a transmission diversity scheme, the bit mask being selected from a set of bit masks, the set of bit masks including a first bit mask associated with a single antenna configuration, a second bit mask associated with a two antenna configuration, and a third bit mask associated with a four antenna configuration, wherein a hamming distance between the first bit mask and the second bit mask is larger than the hamming distance between the first bit mask and the third bit mask and also larger than the hamming distance between the second bit mask and the third bit mask; and
code for applying the bit mask associated with the antenna configuration and the transmission diversity scheme to cyclic redundancy check bits.

18. The computer program product of claim 17, wherein the first bit mask is 0000000000000000, the second bit mask is 1111111111111111, and the third bit mask is 0101010101010101.

19. The computer program product of claim 17, wherein the computer program code further comprises code for channel coding the cyclic redundancy check bits and information bits associated with the cyclic redundancy check bits after applying the bit mask to the cyclic redundancy check bits.

20. The computer program product of claim 17, wherein the code for applying the bit mask to the cyclic redundancy check bits includes code for applying the bit mask to the cyclic redundancy check bits without application of the bit mask to corresponding information bits upon which the cyclic redundancy check bits are based.

* * * * *